US012620072B2

(12) United States Patent
Xiong et al.

(10) Patent No.: US 12,620,072 B2
(45) Date of Patent: May 5, 2026

(54) DISTORTION COMBINATION AND CORRECTION FOR FINAL VIEWS IN VIDEO SEE-THROUGH (VST) AUGMENTED REALITY (AR)

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 18/360,683

(22) Filed: Jul. 27, 2023

(65) Prior Publication Data

US 2024/0233098 A1 Jul. 11, 2024

Related U.S. Application Data

(60) Provisional application No. 63/437,809, filed on Jan. 9, 2023.

(51) Int. Cl.
G06T 5/80 (2024.01)
G06T 3/18 (2024.01)
(Continued)

(52) U.S. Cl.
CPC .................. G06T 5/80 (2024.01); G06T 3/18 (2024.01); G06T 19/006 (2013.01); G06V 10/56 (2022.01); G06T 2207/10024 (2013.01)

(58) Field of Classification Search
CPC .......... G06T 5/08; G06T 3/18; G06T 19/006; G06T 2207/10024; G06V 10/56
See application file for complete search history.

(56) References Cited

U.S. PATENT DOCUMENTS

| | | | |
|---|---|---|---|
| 8,116,008 B2 | 2/2012 | Prior et al. | |
| 9,390,480 B2 | 7/2016 | Kajita et al. | |
| (Continued) | | | |

FOREIGN PATENT DOCUMENTS

| | | |
|---|---|---|
| CN | 114449237 A | 5/2022 |
| EP | 3441935 A1 | 2/2019 |
| JP | 2020167659 A | 10/2020 |

OTHER PUBLICATIONS

Weiqing Yan and Chunping Hou, "Reducing perspective distortion for stereoscopic image stitching," 2016 IEEE International Conference on Multimedia & Expo Workshops (ICMEW), Seattle, WA, USA, 2016, pp. 1-6. (2016).*

(Continued)

*Primary Examiner* — Matthew C Bella

(57) ABSTRACT

A method includes obtaining an image captured by a see-through camera of a video see-through (VST) augmented reality (AR) device. The method also includes identifying a first distortion created by at least one see-through camera lens and identifying a second distortion created by at least one display lens of the VST AR device. The method further includes determining a combined distortion based on the first distortion and the second distortion. The method also includes pre-warping the image to offset the combined distortion such that the image is not distorted when the pre-warped image is viewed by a user through the at least one display lens of the VST AR device. In addition, the method includes presenting the pre-warped image to the user on at least one display of the VST AR device.

20 Claims, 8 Drawing Sheets

(51) Int. Cl.
    *G06T 19/00*     (2011.01)
    *G06V 10/56*     (2022.01)

(56)              References Cited

U.S. PATENT DOCUMENTS

| | | | |
|---|---|---|---|
| 10,043,305 B2 | 8/2018 | Lo et al. | |
| 10,152,775 B1 * | 12/2018 | Bellows | G06T 5/80 |
| 10,156,723 B2 | 12/2018 | Bates et al. | |
| 10,228,562 B2 | 3/2019 | Stafford et al. | |
| 10,241,545 B1 | 3/2019 | Richards et al. | |
| 10,438,331 B2 | 10/2019 | Pohl | |
| 10,565,779 B2 | 2/2020 | Lo et al. | |
| 11,106,042 B2 | 8/2021 | Otsuka et al. | |
| 11,354,787 B2 | 6/2022 | Selstad et al. | |
| 11,423,519 B2 * | 8/2022 | Pohl | G06T 5/80 |
| 12,025,803 B2 | 7/2024 | Nuber et al. | |
| 2017/0115489 A1 | 4/2017 | Hu et al. | |
| 2019/0086679 A1 * | 3/2019 | Ratcliff | H04N 13/307 |
| 2020/0143585 A1 | 5/2020 | Seiler et al. | |
| 2022/0392109 A1 | 12/2022 | Forutanpour et al. | |
| 2023/0022934 A1 | 1/2023 | Pohl | |

OTHER PUBLICATIONS

International Search Report and Written Opinion of the International Searching Authority dated Feb. 7, 2024 in connection with International Application No. PCT/KR2023/016877, 10 pages.
Supplementary European Search Report dated Dec. 19, 2025 in connection with European Patent Application No. 23916387.6, 10 pages.

* cited by examiner

500

START

502
OBTAIN AN IMAGE CAPTURED BY A SEE-THROUGH CAMERA

504
IDENTIFY A FIRST DISTORTION CREATED BY A SEE-THROUGH LENS OF THE SEE-THROUGH CAMERA

506
IDENTIFY A SECOND DISTORTION CREATED BY A DISPLAY LENS

508
DETERMINE A COMBINED DISTORTION

510
PRE-WARP THE IMAGE TO OFFSET THE COMBINED DISTORTION

512
PRESENT THE PRE-WARPED IMAGE

END

DISTORTION COMBINATION AND CORRECTION FOR FINAL VIEWS IN VIDEO SEE-THROUGH (VST) AUGMENTED REALITY (AR)

CROSS-REFERENCE TO RELATED APPLICATION AND PRIORITY CLAIM

This application claims priority under 35 U.S.C. § 119(e) to U.S. Provisional Patent Application No. 63/437,809 filed on Jan. 9, 2023, which is hereby incorporated by reference in its entirety.

TECHNICAL FIELD

This disclosure relates generally to augmented reality (AR) systems and processes. More specifically, this disclosure relates to distortion combination and correction for final views in video see-through (VST) AR.

BACKGROUND

Video see-through (VST) augmented reality (AR) systems can access an environment around a user utilizing see-through cameras installed on a VST headset. A user can see mixed reality information of image frames captured by the see-through cameras and virtual objects generated by a graphics pipeline through at least one display lens. In a VST AR pipeline, a see-through camera lens or lenses can create distortions of captured image frames, and the display lens or lenses can create distortions while the user sees a view rendered on the display through the display lens(es).

SUMMARY

This disclosure provides distortion combination and correction for final views in video see-through (VST) augmented reality (AR).

In a first embodiment, a method includes obtaining an image captured by a see-through camera of a VST AR device. The method also includes identifying a first distortion created by at least one see-through camera lens and identifying a second distortion created by at least one display lens of the VST AR device. The method further includes determining a combined distortion based on the first distortion and the second distortion. The method also includes pre-warping the image to offset the combined distortion such that the image is not distorted when the pre-warped image is viewed by a user through the at least one display lens of the VST AR device. In addition, the method includes presenting the pre-warped image to the user on at least one display of the VST AR device.

In a second embodiment, a VST AR device includes at least one display, at least one see-through camera, and at least one processing device. The at least one display includes at least one display lens. The at least one see-through camera includes at least one see-through camera lens and is configured to capture an image. The at least one processing device is configured to obtain the image captured by the at least one see-through camera, identify a first distortion created by the at least one see-through camera lens, and identify a second distortion created by the at least one display lens. The at least one processing device is also configured to determine a combined distortion based on the first distortion and the second distortion. The at least one processing device is further configured to pre-warp the image to offset the combined distortion such that the image is not distorted when the pre-warped image is viewed by a user through the at least one display lens. In addition, the at least one processing device is configured to present the pre-warped image to the user on the at least one display.

In a third embodiment, a non-transitory machine readable medium contains instructions that when executed cause at least one processor to obtain an image captured by a see-through camera of a VST AR device. The non-transitory machine readable medium also contains instructions that when executed cause the at least one processor to identify a first distortion created by at least one see-through camera lens and identify a second distortion created by at least one display lens of the VST AR device. The non-transitory machine readable medium further contains instructions that when executed cause the at least one processor to determine a combined distortion based on the first distortion and the second distortion. The non-transitory machine readable medium also contains instructions that when executed also cause the at least one processor to pre-warp the image to offset the combined distortion such that the image is not distorted when the pre-warped image is viewed by a user through the at least one display lens of the VST AR device. In addition, the non-transitory machine readable medium contains instructions that when executed cause the at least one processor to present the pre-warped image to the user on at least one display of the VST AR device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a HMD, electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module,"

"device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, video see-through (VST) augmented reality (AR) systems can access an environment around a user utilizing see-through cameras installed on a VST headset. A user can see mixed reality information of image frames captured by the see-through cameras and virtual objects generated by a graphics pipeline through at least one display lens. In a VST AR pipeline, a see-through camera lens or lenses can create distortions of captured image frames, and the display lens or lenses can create distortions while the user sees a view rendered on the display through the display lens(es). For example, geometric distortions and color aberrations from see-through camera and display lenses can distort images presented to the user. Unfortunately, distortion correction can typically cause latency issues in the VST AR pipeline.

This disclosure provides techniques for distortion combination and correction for final views in VST AR. As described in more detail below, an image that is captured by a see-through camera of a VST AR device can be obtained. A first distortion created by at least one see-through camera lens can be identified, and a second distortion created by at least one display lens of the VST AR device can be identified. A combined distortion can be determined based on the first distortion and the second distortion. The image can be pre-warped to offset the combined distortion such that the image is not distorted when the pre-warped image is viewed by a user through the at least one display lens of the VST AR device. The pre-warped image can be presented to the user on at least one display of the VST AR device.

In this way, distortions from a see-through camera lens and a display lens can be combined in order to help compensate for geometric distortions, chromatic aberrations, or other distortions in a final view of an image. This can be performed while reducing latency issues compared to other approaches. Also, in some embodiments, a distortion mesh configured to compensate for the combined distortion may be used, such as when the correction of the geometric distortions and chromatic aberrations can be performed in an initialization stage or other stage of the VST AR pipeline based on the distortion mesh. This can help to simplify and speed up the correction process. In addition, a final view of a scene may be rendered directly from the image captured by the see-through camera based on the distortion mesh, which again can speed up the process.

Figure 1:
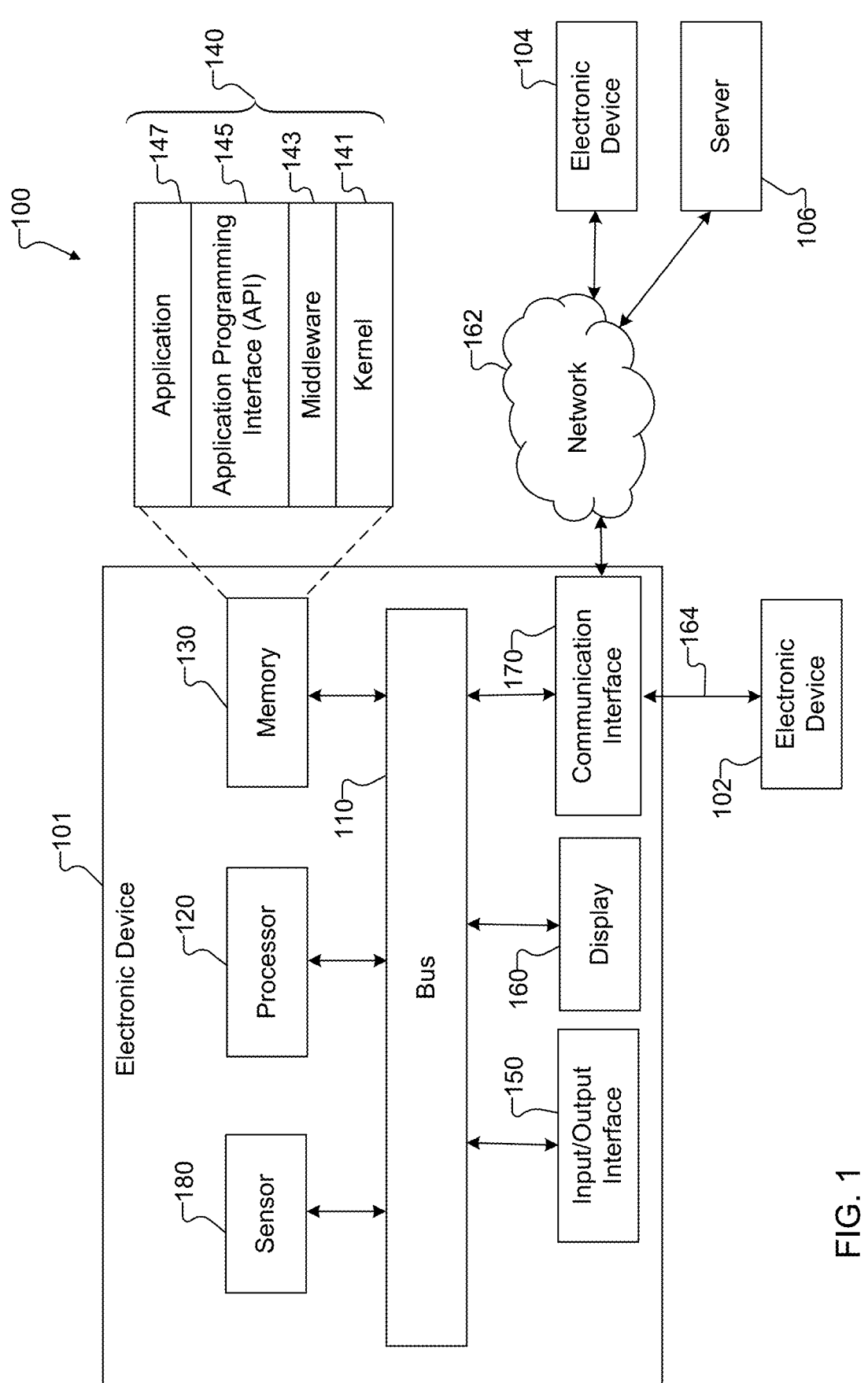
FIG. 1 illustrates an example network configuration including an electronic device in accordance with this disclosure.

FIG. 1 illustrates an example network configuration 100 including an electronic device in accordance with this disclosure. According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may obtain and process input images to perform distortion combination and correction for final views in order to support at least one VST AR application as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted as an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input images to perform distortion combination and correction for final views in order to support at least one VST AR application. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may obtain and process input images to perform distortion combination and correction for final views in order to support at least one VST AR application as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
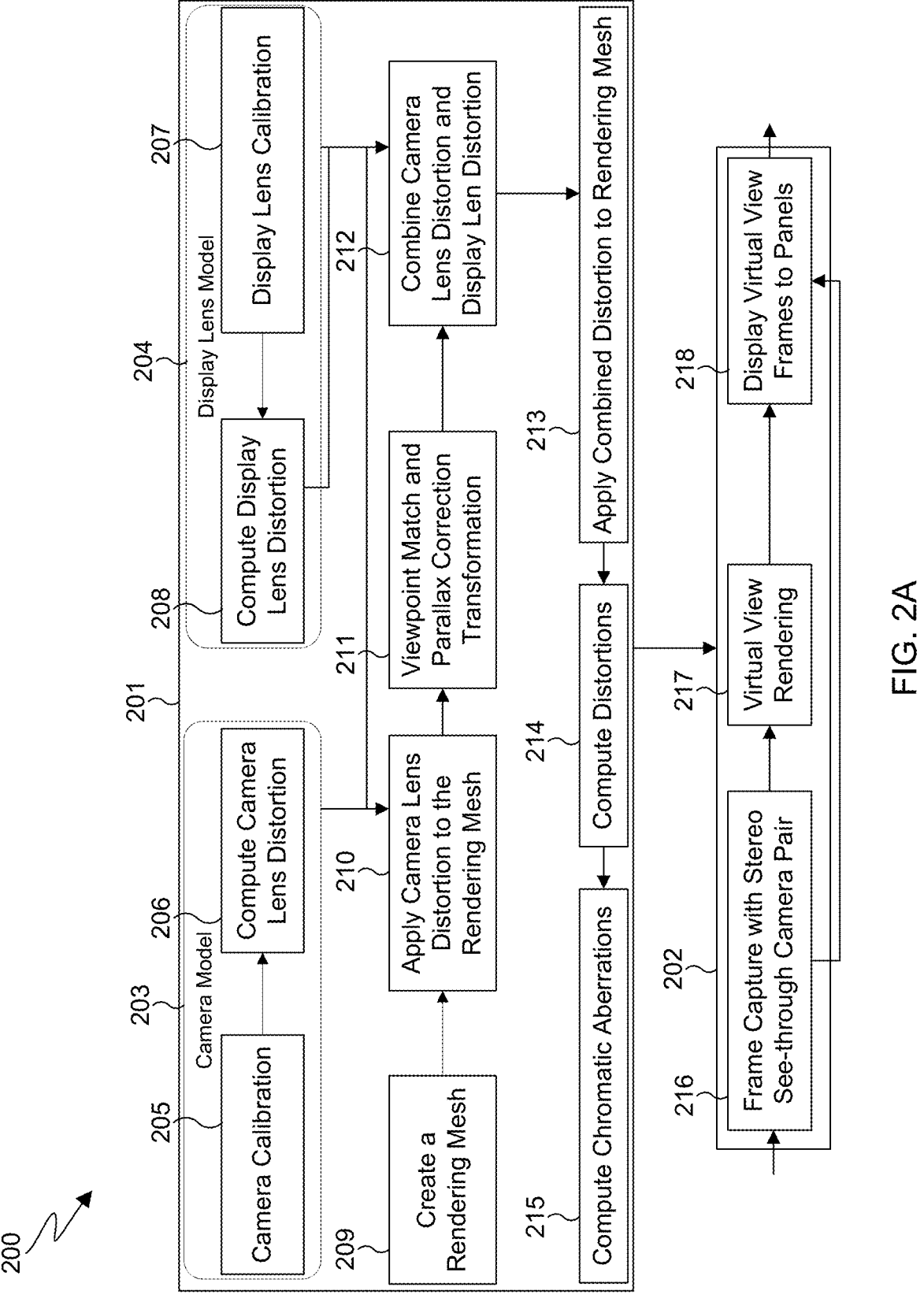
FIGS. 2A through 2F illustrate an example process for distortion combination and correction for final views in video see-through (VST) augmented reality (AR) in accordance with this disclosure.

FIGS. 2A through 2F illustrate an example process 200 for distortion combination and correction for final views in VST AR in accordance with this disclosure. For ease of explanation, the process 200 of FIG. 2A is described as being performed using the electronic device 101 of FIG. 1. However, the process 200 may be used with any other suitable device(s) and in any other suitable system(s).

As shown in FIG. 2A, the process 200 can include an initialization stage 201 and an online rendering stage 202. The initialization stage 201 generally operates to determine one or more transformations to be applied in order to pre-warp an image displayed to a user, and the online rendering stage 202 generally operates to apply the transformation(s) to the image and present the transformed image on at least one display panel 220. The at least one display panel 220 may represent one or more displays 160 of the electronic device 101. Note that multiple separate display panels 220 (such as left and right display panels separately viewable by the eyes of the user) or a single display panel 220 (such as one where left and right portions of the display panel are separately viewable by the eyes of the user) may be used to present rendered views.

The initialization stage 201 includes a camera model operation 203 and a display lens model operation 204, which are respectively used to estimate distortions created by at least one see-through camera 221 and at least one display lens 222. The at least one see-through camera 221 may represent one or more imaging sensors 180 of the electronic device 101. The at least one display lens 222 may represent one or more lenses forming a part of the at least one display panel 220.

During the camera model operation 203, the electronic device 101 can perform a see-through camera calibration operation 205 in order to determine intrinsic and extrinsic parameters of one or more see-through camera lenses 223 of the see-through camera(s) 221. For example, the see-through camera calibration operation 205 can be used to generate a camera matrix and a distortion model, which can be used to determine camera distortion. The see-through camera calibration operation 205 may use any suitable technique(s) to identify intrinsic and extrinsic parameters of the see-through camera lens(es) 223.

As part of the camera model operation 203, the electronic device 101 can perform a camera lens distortion computation operation 206 using the intrinsic and extrinsic parameters of the see-through camera lens(es) 223. For example, the camera lens distortion computation operation 206 can identify see-through camera lens distortions 224 associated with the at least one see-through camera lens 223, such as barrel and pincushion distortions. As shown in FIG. 2C, the see-through camera lens distortions 224 can transform a scene 225 into a first distorted image 226. The first distorted image 226 is how the scene appears to an optical sensor of the see-through camera 221 when viewed through the see-through camera lens 223.

During the display lens model operation 204, the electronic device 101 can perform a display lens calibration operation 207 in order to determine intrinsic and extrinsic parameters of the display lens(es) 222. The display lens calibration operation 207 may use any suitable technique(s) to identify intrinsic and extrinsic parameters of the display lens(es) 222. As part of the display lens model operation 204, the electronic device 101 can perform a display lens distortion computation operation 208 using the intrinsic and extrinsic parameters of the display lens(es) 222. For example, the display lens distortion computation operation 208 can identify display lens distortions 227 associated with the at least one display lens 222, such as barrel and pincushion distortions. In some cases, the display lens distortion computation operation 208 can generate reversed display lens distortions 228, which can be used to correct the display lens distortions 227 of the display lens(es) 222.

The initialization stage 201 also includes various operations 209-215 that operate based on outputs of the camera model operation 203 and the display lens model operation 204. For example, the electronic device 101 can perform a rendering mesh creation operation 209 in order to generate a rendering mesh. A rendering mesh provides an ability to map an image and simplifies transforms applied to the image. A camera lens distortion application operation 210 can be performed by the electronic device 101 to apply the camera lens distortion to the rendering mesh in order to generate a first distorted mesh 229. As shown in FIG. 2D, the viewpoint match and parallax correction transformation operation 211 can transform the first distorted mesh 229 into a second distorted mesh 232.

The first distorted mesh 229 can be provided to a viewpoint match and parallax correction transformation operation 211, which can modify the first distorted mesh 229. For example, as shown in FIG. 2D, the viewpoint match and parallax correction transformation operation 211 can be performed to match one or more camera viewpoints 230 and one or more rendering viewpoints 231. As a particular example, the viewpoint match and parallax correction transformation operation 211 may generate one or more transformations that help to match each camera viewpoint 230 and a corresponding rendering viewpoint 231. These transformations can be based on the one or more transformations identified by the viewpoint match and parallax correction transformation operation 211. Because a camera and a user's eye cannot occupy the same physical space, an image captured by the camera can be modified to correct for depth and/or field-of-view differences from the rendering viewpoint 231.

The viewpoint match and parallax correction transformation operation 211 can also be performed to identify adjustments that might be needed to remove view artifacts in an overlapping area between multiple see-through cameras 221. For example, because a camera viewpoint 230 is not identical to a rendering viewpoint 231, objects at different depths can be distorted if adjusted equally. As a particular example, objects closer in depth to the viewpoints may be adjusted at greater rates than objects at further distances or a background of a real-world scene. The viewpoint match and parallax correction transformation operation 211 can determine differences in viewing objects in 3D space based on line-of-sight, and the viewpoint match and parallax correction transformation operation 211 can be used to correct these differences. For instance, the viewpoint match and parallax correction transformation operation 211 may correct objects in the real-world scene that are affected by parallax in rendered images.

The electronic device 101 can perform a combined distortion operation 212 in order to combine the distortion(s) created by at least one see-through camera lens 223 and the distortion(s) created by at least one display lens 222. For example, the combined distortion operation 212 may combine the second distorted mesh 232, the see-through camera lens distortions 224, and the reversed display lens distortions 228 into a combined distortion mesh 233. The combined distortion mesh 233 provides a single set of transformations to be applied to the initial image of the scene as captured by the see-through camera (instead of separate sets of transformations to separately account for distortions created by the see-through camera lens 223 and the display lens 222).

Figure 2B:
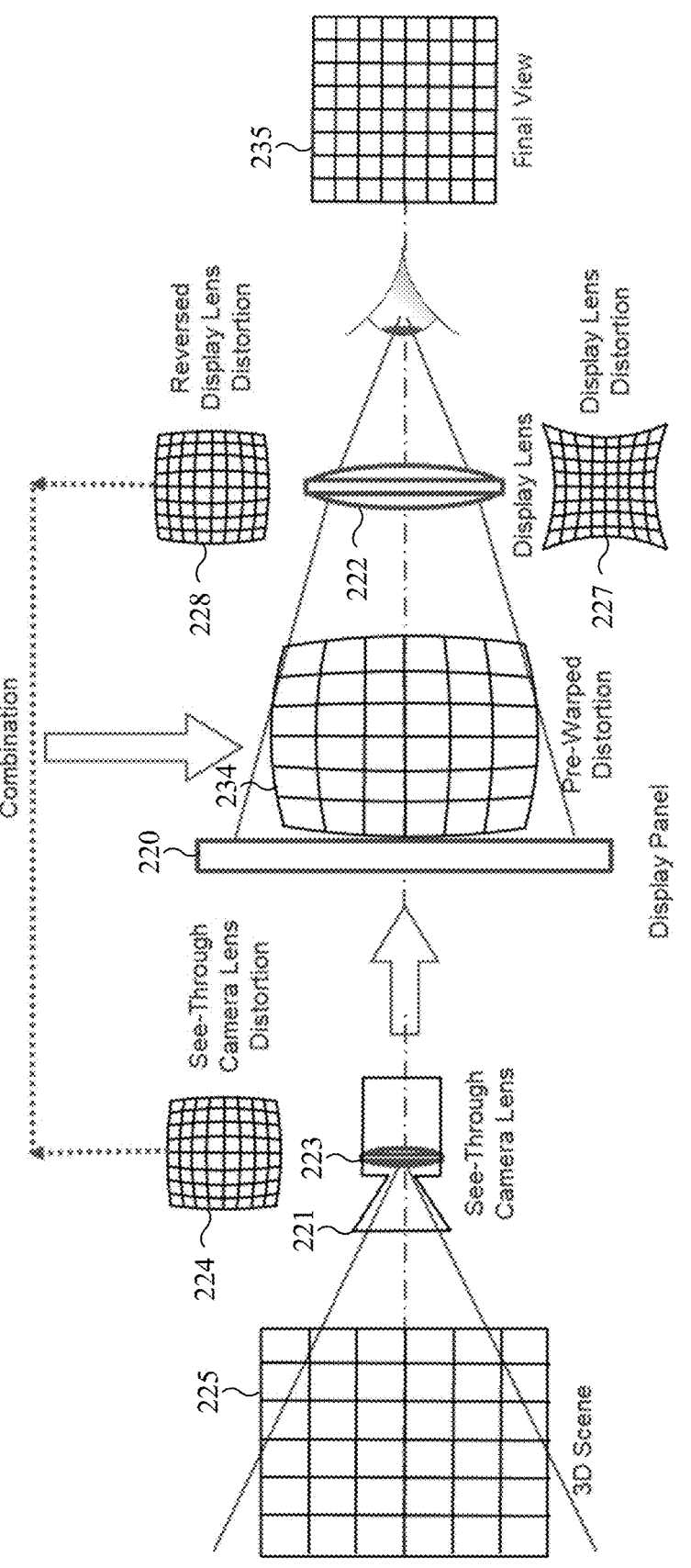
Figure 2C:
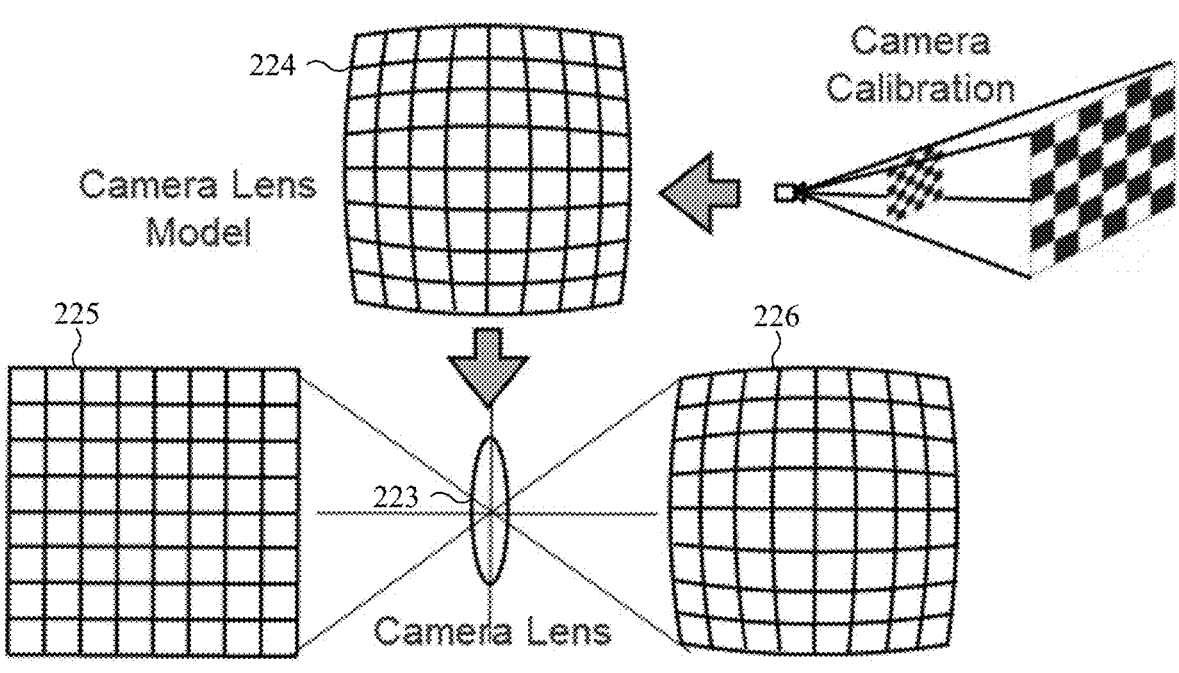
Figure 2D:
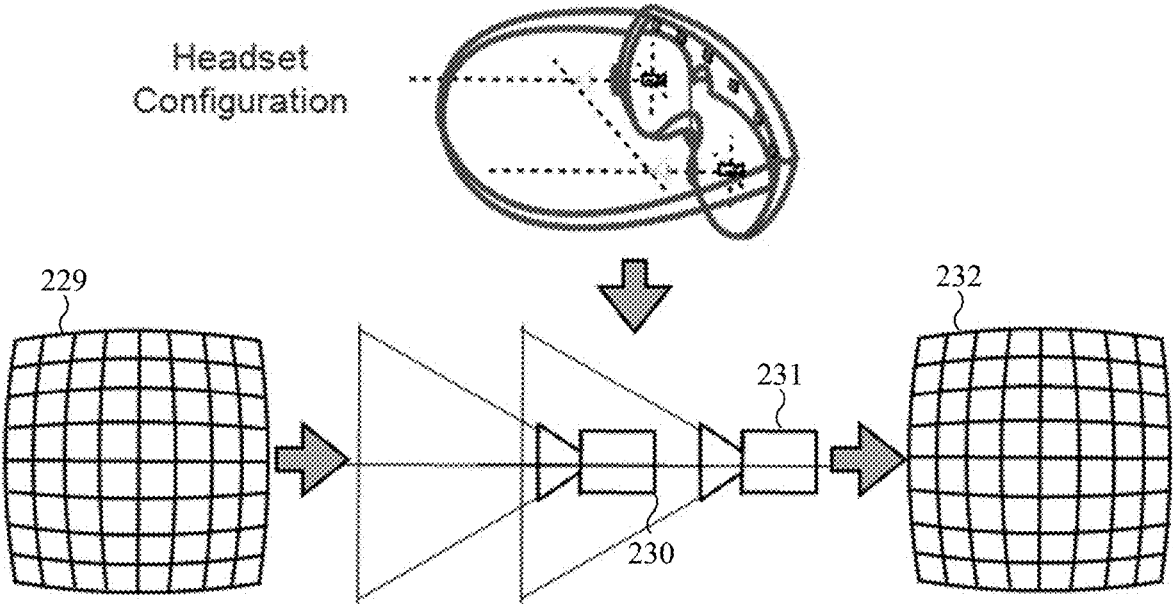
Figure 2E:
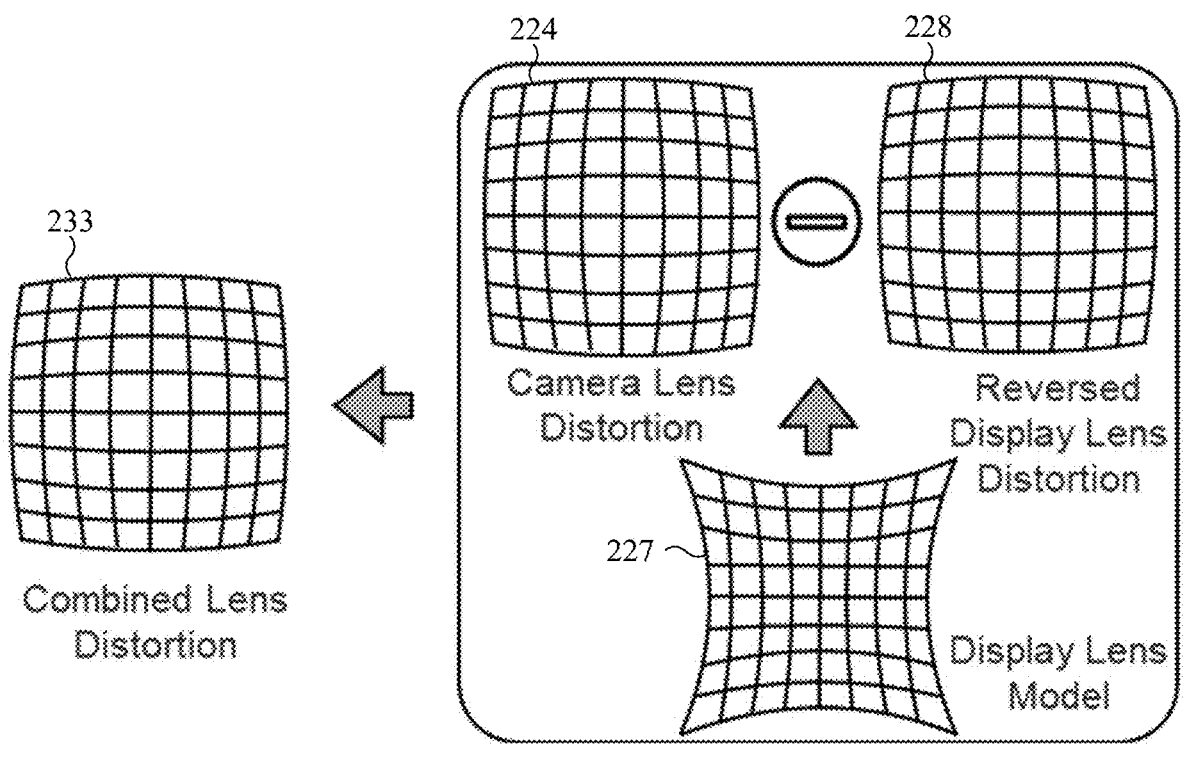
Figure 2F:
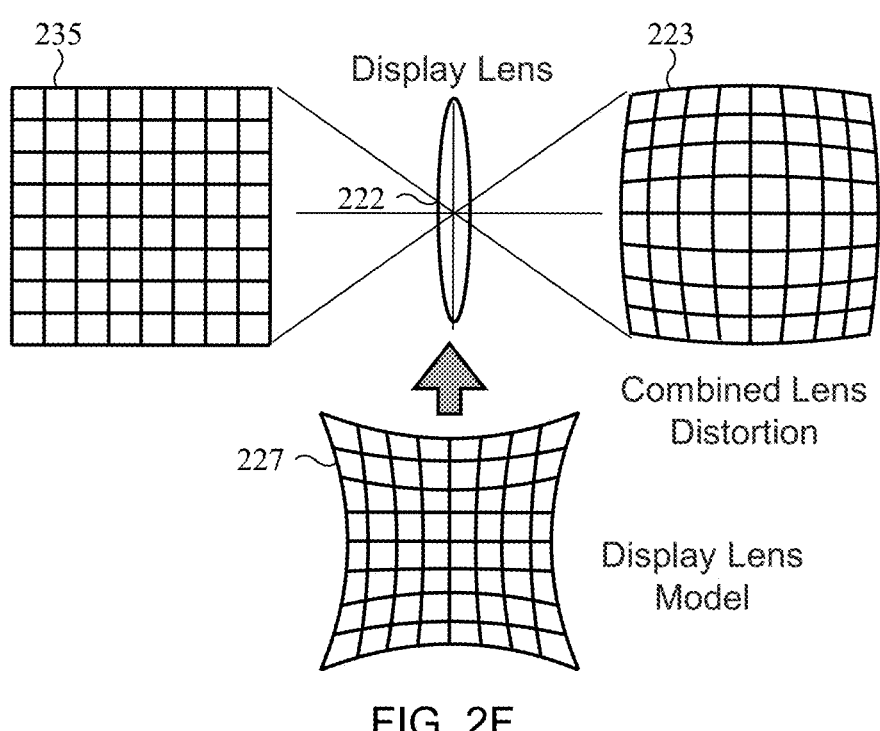

The electronic device 101 can perform a pre-warp mesh generation 213 by applying the combined distortion mesh 233 to the rendering mesh in order to generate a pre-warped distortion 234 as shown in FIG. 2B. The pre-warped distortion 234 can be applied to an image in order to transform the image into a final view 235 for viewing through the associated display lens 222. Among other things, the pre-warped distortion 234 may reduce an amount of processing of the image and thereby reduce latency. In some cases, the electronic device 101 can perform a distortion computation operation 214 in order to determine distortions in each of multiple color channels, such as in each of red, green, and blue color channels. Here, the distortion mesh can be pre-warped with the combined distortion in order to compensate for the display lens geometric distortion in a green color channel, which is a geometric distortion correction for the final view 235. Distortions in the red and blue color channels can be combined to create pre-warped distortion meshes as compensation for distortions in the red and blue color channels.

Chromatic aberrations can be determined with distortion differences, such as between the red and green color channels and between the blue and the green color channels, in a chromatic aberrations computation operation 215. Here, the geometric distortions and chromatic aberrations can be separated for convenience and efficiency of implementing the corrections, such as in GPU shaders of a rendering pipeline. The created static distortion mesh with the transformations of camera distortion, viewpoint matching, display lens geometric distortion correction, and chromatic aberration correction can be prepared for rendering the final view 235.

In the online rendering stage 202, images are captured using a see-through camera pair by the electronic device 101 in the image capture operation 216. For example, multiple see-through cameras 221 can respectively perform an image capture operation 216 in order to generate at least first and second images. In some embodiments, the first and second images can be left and right image captures from left and right see-through cameras 221. In a virtual view rendering operation 217, one or more final views 235 are rendered directly from the captured images and the pre-warped static distortion mesh created in the initialization stage 201 by the electronic device 101. For example, the virtual view rendering operation 217 can render a final view 235 for display on at least one display panel, such as the display panel(s)

220. In some cases, the electronic device 101 may display a first rendered image on a first panel and a second rendered image on a second panel, or the electronic device 101 may display a first rendered image and a second rendered image on different portions of a single panel. Since the static mesh is already transformed with camera distortion, viewpoint matching, display lens geometric distortion correction, and chromatic aberration correction in the initialization stage 201, these transformations may reduce latency in the online rendering. Finally, the rendered final view(s) 235 can be displayed to the display panel(s) 220 for the user to view in a virtual view display operation 218. Depending on the implementation, the virtual view display operation 218 can be pre-rendered or can be dynamically rendered. As the combined distortion is applied to the captured image(s), the final view(s) 235 can be viewed by the user with reduced or minimal distortion.

It should be noted that the functions shown in or described with respect to FIGS. 2A through 2F can be implemented in an electronic device 101, 102, 104, server 106, or other device(s) in any suitable manner. For example, in some embodiments, at least some of the functions shown in or described with respect to FIGS. 2A through 2F can be implemented or supported using one or more software applications or other software instructions that are executed by the processor 120 of the electronic device 101, 102, 104, server 106, or other device(s). In other embodiments, at least some of the functions shown in or described with respect to FIGS. 2A through 2F can be implemented or supported using dedicated hardware components. In general, the functions shown in or described with respect to FIGS. 2A through 2F can be performed using any suitable hardware or any suitable combination of hardware and software/firmware instructions.

Although FIGS. 2A through 2F illustrate one example of a process 200 for distortion combination and correction for final views in VST AR, various changes may be made to FIGS. 2A through 2F. For example, while shown as a series of operations, various operations in FIGS. 2A through 2F may overlap, occur in parallel, occur in a different order, or occur any number of times. Also, various components and functions in FIGS. 2A through 2F may be combined, further subdivided, replicated, or rearranged according to particular needs. In addition, one or more additional components and functions may be included if needed or desired.

Figure 3:
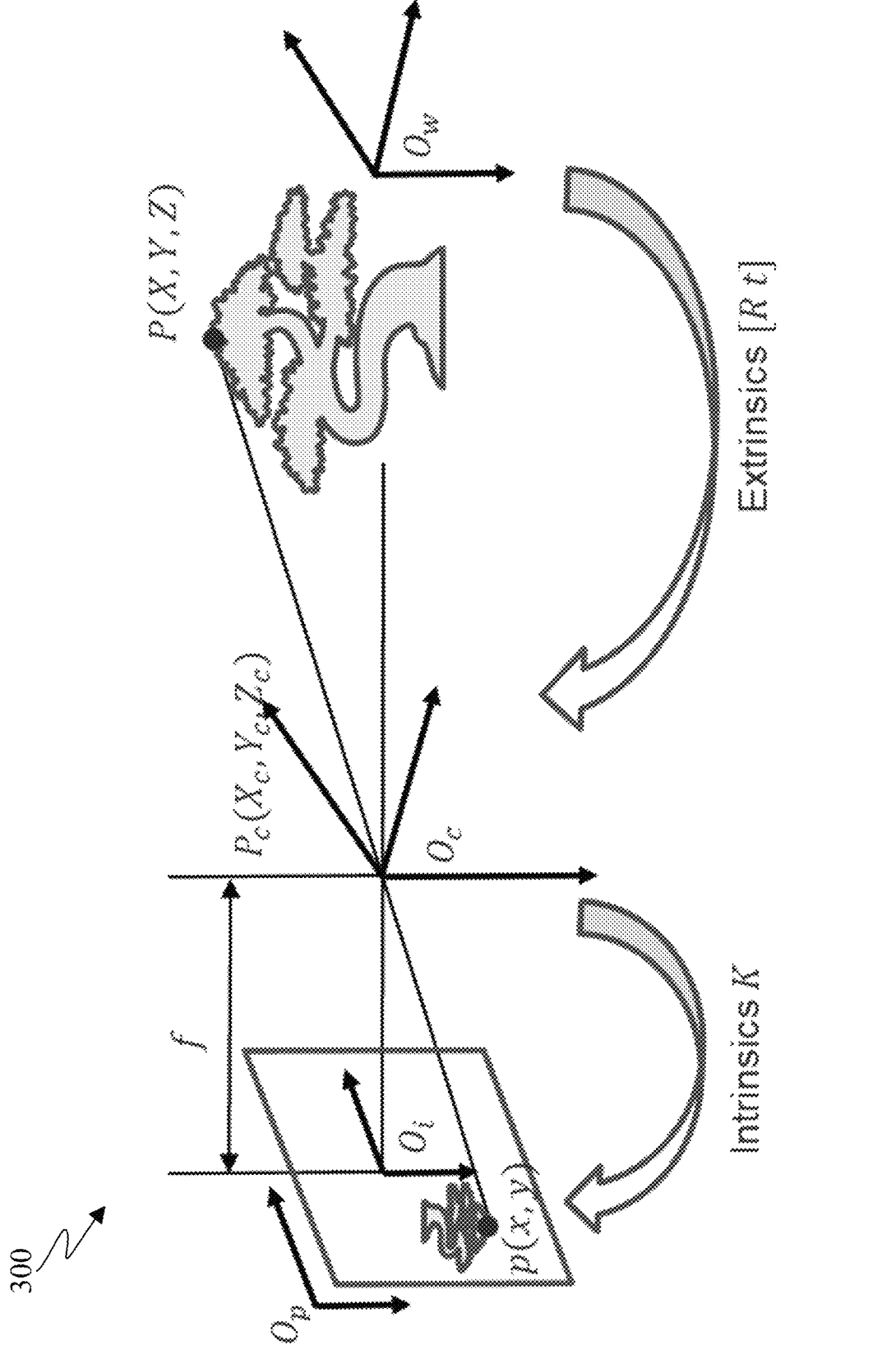
FIG. 3 illustrates an example camera matrix and lens distortion model in accordance with this disclosure.

FIG. 3 illustrates an example camera matrix and lens distortion model 300 in accordance with this disclosure. The camera matrix and lens distortion model 300 here represents one example of the distortions that might be created by a specific see-through camera lens 223, which are described above with respect to FIGS. 2A through 2F and for which pre-warping may be performed to compensate. As shown in FIG. 3, a regular mesh is distorted when light rays pass through the see-through camera lens 223. In this example, the camera lens changes the mesh from a regular rectangular shape to a barrel distortion shape.

For a fisheye lens, a fisheye lens distortion model can be used to determine geometric distortions. For example, a 3D point P(X, Y, Z) from a world coordinate system may be transformed into a corresponding point in a camera coordinate system $P_c(X_c, Y_c, Z_c)$, such as in the following manner.

$$\begin{pmatrix} X_c \\ Y_c \\ Z_c \end{pmatrix} = R \begin{pmatrix} X \\ Y \\ Z \end{pmatrix} + t \tag{1}$$

Here, [R t] represent camera extrinsic properties, where R represents a rotation matrix and t represents a translation vector. In some cases, the image point p(x, y) can be determined with a pinhole projection, such as in the following manner.

$$\begin{pmatrix} x \\ y \end{pmatrix} = \begin{pmatrix} \frac{x_c}{z_c} \\ \frac{y_c}{z_c} \\ \frac{z_c}{z_c} \end{pmatrix} \tag{2}$$

From Equation (2), the following can be obtained.

$$\begin{cases} r^2 = x^2 + y^2 \\ \theta = a\tan(r) \end{cases} \tag{3}$$

Here, r represents a radius of the distortion, and $\theta$ represents an angle of the distortion. Based on this, the fisheye distortion may be represented as follows.

$$\theta_d = \theta\left(1 + k_1\theta^2 + k_2\theta^4 + k_3\theta^6 + k_4\theta^8\right) \tag{4}$$

Here, k represents the fisheye distortion. As a result, the distorted point coordinates may be determined as follows.

$$\begin{cases} x_d = \left(\frac{\theta_d}{r}\right)x \\ y_d = \left(\frac{\theta_d}{r}\right)y \end{cases} \tag{5}$$

Also, the pixel coordinates may be determined as follows.

$$\begin{cases} u = f_d(x_d + xy_d) + c_x \\ v = f_y y_d + c_y \end{cases} \tag{6}$$

Here, $(c_x, c_y)$ represent principal points of the camera.

For a non-fisheye lens, radial distortion may be determined as follows.

$$\begin{cases} x_d = x\left(1 + k_1 r^2 + k_2 r^4 + k_3 r^6\right) \\ y_d = y\left(1 + k_1 r^2 + k_2 r^4 + k_3 r^6\right) \end{cases} \tag{7}$$

Here, $(x_d, y_d)$ represent distorted coordinates, (x, y) represent undistorted coordinates, and $(k_1, k_2, k_3)$ represent radial distortion coefficients. In some cases, the radius used to identify the radial distortion can be determined as follows.

$$r^2 = x^2 + y^2 \tag{8}$$

Also, tangential distortion may be determined as follows.

$$\begin{cases} x_d = x + \left[2p_1 xy + p_2\left(r^2 + 2x^2\right)\right] \\ y_d = y + \left[p_1\left(r^2 + 2y^2\right) + 2p_2 xy\right] \end{cases} \tag{9}$$

Here, $(p_1, p_2)$ represent tangential distortion coefficients. Based on this, the distortion model may be defined as follows.

$$D_c = (k_1 k_2 p_1 p_2 k_3) \tag{10}$$

Here, $D_c$ represents the distortion model. Also, the camera matrix may be defined as follows.

$$K = \begin{bmatrix} f_x & 0 & c_x \\ 0 & f_y & c_y \\ 0 & 0 & 1 \end{bmatrix} \tag{11}$$

Here, $(f_x, f_y)$ represent focal lengths of the cameras, and $(c_x, c_y)$ represent principal points of the cameras.

The regular mesh is also distorted when light rays pass through the display lens 222, which may change the mesh from a regular rectangular shape to a pincushion distortion shape. In some cases, the display lens distortion may be determined as follows.

$$\begin{cases} x_d = x\left(k_0 + k_1 r + k_2 r^2 + k_3 r^3 + k_4 r^4 + k_5 r^5 + k_6 r^6\right) \\ y_d = y\left(k_0 + k_1 r + k_2 r^2 + k_3 r^3 + k_4 r^4 + k_5 r^5 + k_6 r^6\right) \end{cases} \tag{12}$$

Here, $(x_d, y_d)$ represent distorted coordinates, (x, y) represent undistorted coordinates, and $(k_0, k_1, k_2, k_3, k_4, k_5, k_6)$ represent radial distortion coefficients.

Although FIG. 3 illustrates one example of a camera matrix and lens distortion model 300, various changes may be made to FIG. 3. For example, the specific mathematical expressions described above are for illustration only and can change as needed or desired.

Figure 4:
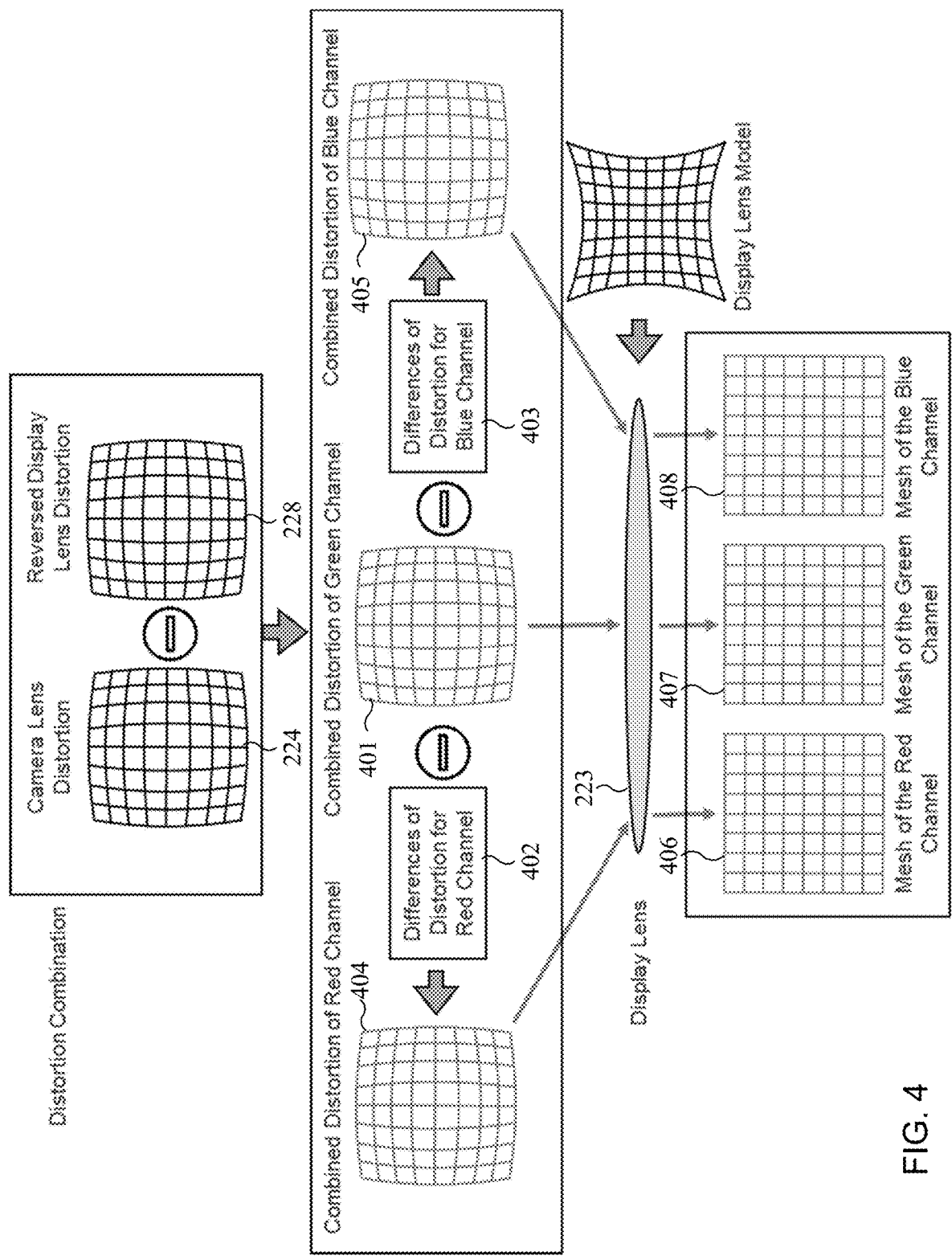
FIG. 4 illustrates an example distortion combination for display lens geometric distortion and chromatic aberration correction in accordance with this disclosure.

FIG. 4 illustrates an example distortion combination 400 for display lens geometric distortion and chromatic aberration correction in accordance with this disclosure. This distortion combination 400 may, for example, be used to generate a static mesh as described above. As shown in FIG. 4, geometric distortions and chromatic aberrations from the see-through camera lens 223 and the display lens 222 are corrected using the distortion combination 400.

In this example, during a mesh transformation process, a green distortion mesh 401 for a green color channel is pre-warped in order to provide geometric distortion correction. Distortions of a red color channel are determined, and red distortion differences 402 between the red and green color channels can be determined. Similarly, distortions of a blue color channel can be determined, and blue distortion differences 403 between the blue and green color channels can be determined. Using the red and blue distortions differences 402 and 403, meshes for the red color channel and the blue color channel can be pre-warped to obtain a red distortion mesh 404 for the red color channel and a blue distortion mesh 405 for the blue color channel.

In order to implement shaders efficiently, the green distortion mesh 401 of the green color channel is used as a base, and the red and blue distortion differences 402 and 403 are used in comparison to the green distortion mesh 401. In this way, all three distortion meshes of the three color channels may not need to be transferred to GPU shaders. Rather, in some embodiments, only the green distortion mesh 401 of the green color channel and the red and blue distortion differences 402 and 403 of the red and blue color channels are transferred to a GPU shader for rendering. With the pre-warped meshes 401, 404, and 405 of the green, red, and blue color channels rendered and displayed on the display panel(s) 220, the pre-warped distortions can compensate for distortions created by the display lens 222 so that the user can see the regular shape meshes of the red, blue, and green color channels 406, 407, and 408, which correct for display lens geometric distortions and chromatic aberrations.

Although FIG. 4 illustrates one example of a distortion combination 400 for display lens geometric distortion and chromatic aberration correction, various changes may be made to FIG. 4. For example, the specific distortions and color channels described above are for illustration only and can change as needed or desired.

Figure 5:
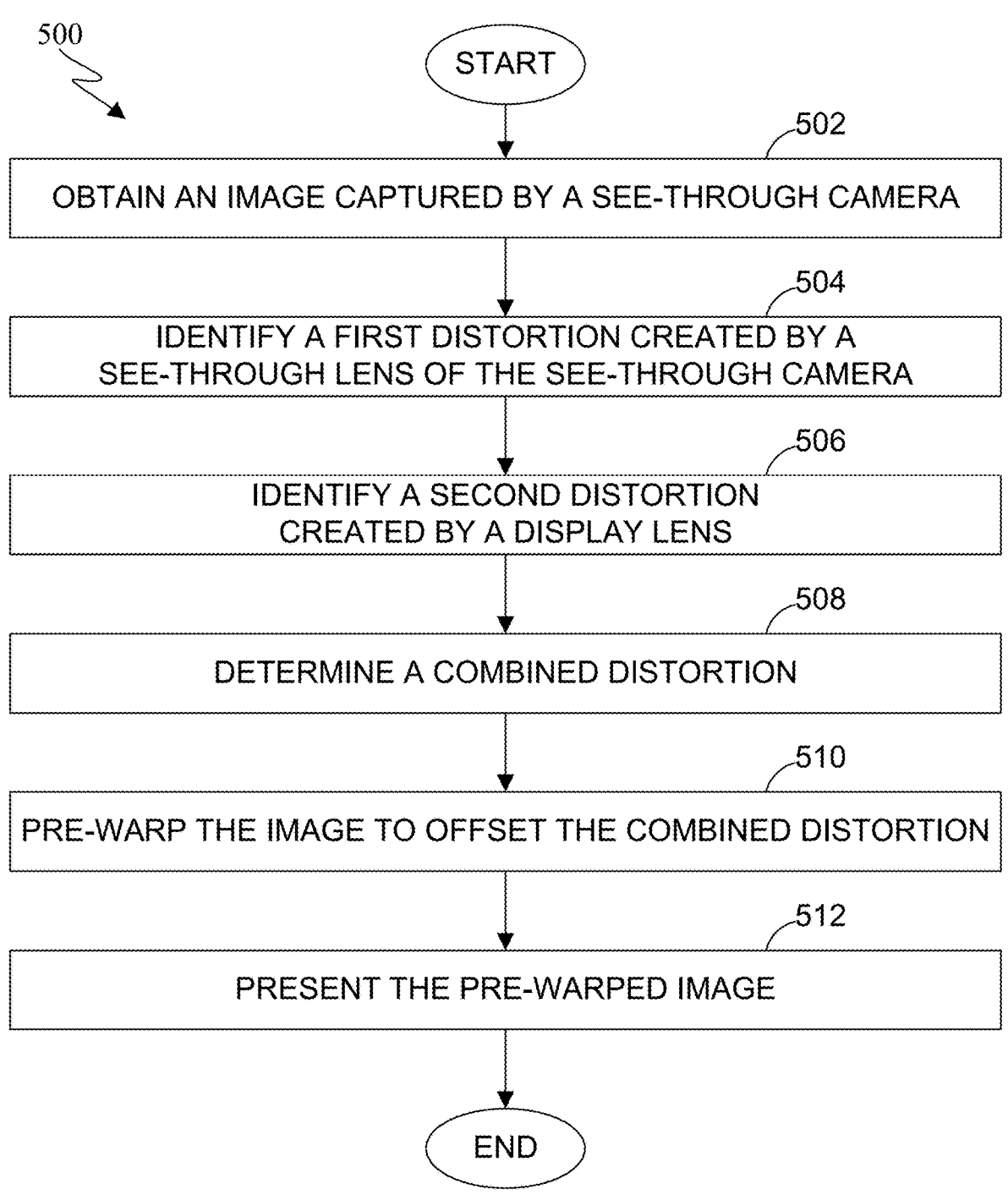
FIG. 5 illustrates an example method for distortion combination and correction for final views in VST AR in accordance with this disclosure.

FIG. 5 illustrates an example method 500 for distortion combination and correction for final views in VST AR in accordance with this disclosure. For ease of explanation, the method 500 of FIG. 5 is described as being performed using the electronic device 101 in the network configuration 100 of FIG. 1. However, the method 500 may be performed using any other suitable device(s) and in any other suitable system(s).

As shown in FIG. 5, a VST device obtains an image captured by a see-through camera at step 502. This may include, for example, the processor 120 of the electronic device 101 receiving the image from a see-through camera 221 of the electronic device 101, where the see-through camera 221 may include a see-through camera lens 223. The see-through camera lens 223 can cause the image of an actual scene to be distorted based on the intrinsic properties of the see-through camera lens 223. The VST device identifies a first distortion created by a see-through camera lens of the see-through camera at step 504. This may include, for example, the processor 120 of the electronic device 101 identifying see-through camera lens distortion 224 created by a see-through camera lens 223 of the see-through camera 221. The first distortion may be created based on intrinsic properties of the see-through camera lens 223 as the image is viewed through the see-through camera lens 223 by a sensor of the see-through camera 221. The VST device identifies a second distortion created by a display lens at step 506. This may include, for example, the processor 120 of the electronic device 101 identifying display lens distortion 227 created by a display lens 222. The second distortion may be created based on geometric distortion and chromatic aberration properties of the display lens 222 when the image is projected from a display panel 220 through the display lens 222.

The VST device determines a combined distortion at step 508. This may include, for example, the processor 120 of the electronic device 101 determining the combined distortion based on a combination of the first distortion of the see-through camera lens 223 and the second distortion of the display lens 222. The second distortion of the display lens 222 can be reversed for combining with the first distortion of the see-through camera lens 223. Distortions and chromatic aberrations can be determined based on the combined distortion. VST device pre-warps the image to offset the combined distortion at step 510. This may include, for example, the processor 120 of the electronic device 101 pre-warping the image to offset the combined distortion in a manner that the image is not distorted when the pre-warped image is viewed by a user through the at least one display lens of the VST AR device. The VST device presents the pre-warped image at step 512. This may include, for example, the processor 120 of the electronic device 101 displaying the pre-warped image on at least one display panel 220 of the VST AR device for undistorted viewing of the image through the display lens 222.

In some embodiments, the pre-warping performed at step 510 includes retrieving a specified distortion mesh for a first color channel, where the specified distortion mesh is configured to compensate for the combined distortion. A first specified distortion difference is accessed for a difference between the first color channel and a second color channel, and a second specified distortion difference is accessed for a difference between the first color channel and a third color channel. The specified distortion mesh can be applied to pre-warp the first color channel of the image, and the first and second specified distortion differences can be respectively applied with the specified distortion mesh to pre-warp the second and third color channels of the image. The first and second specified distortion differences can be applied instead of applying second and third distortion meshes to pre-warp the second and third color channels of the image. Also, in some embodiments, transformations can also be implemented in a GPU shader, which allows for convenient integration with other dynamic transformations (such as depth re-projection and time-warping), and GPU shader implementations can be extended to both static and dynamic processing. In addition, in some embodiments, the distortion of the display lens distortion model can be determined to only compensate a distortion of the display lens for geometric distortion and chromatic aberration correction. In this case, a camera undistortion operation can be added to remove camera distortion, and the final display distortion correction may not need to be relevant to the camera distortion computing.

Although FIG. 5 illustrates one example of a method 500 for distortion combination and correction for final views in VST AR, various changes may be made to FIG. 5. For example, while shown as a series of steps, various steps in FIG. 5 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:

obtaining an image captured by a see-through camera of a video see-through (VST) augmented reality (AR) device;

identifying a first distortion created by at least one see-through camera lens;

identifying a second distortion created by at least one display lens of the VST AR device;

determining a combined distortion based on the first distortion and the second distortion;

pre-warping the image to offset the combined distortion; and presenting the pre-warped image to a user on at least one display of the VST AR device;

wherein pre-warping the image comprises:

retrieving a specified distortion mesh configured to compensate for the combined distortion, wherein the specified distortion mesh is associated with a first color channel;

applying the specified distortion mesh to pre-warp the first color channel of the image;

accessing a first specified distortion difference between the first color channel and a second color channel; and applying the specified distortion mesh and the first specified distortion difference to pre-warp the second color channel of the image.

2. The method of claim 1, wherein pre-warping the image further comprises:

accessing a second specified distortion difference between the first color channel and a third color channel; and applying the specified distortion mesh and the second specified distortion difference to pre-warp the third color channel of the image.

3. The method of claim 1, wherein the first specified distortion difference is passed to a shader instead of a distortion mesh for the second color channel.

4. The method of claim 1, wherein the combined distortion is based on one or more intrinsic properties of the at least one see-through camera lens.

5. The method of claim 1, wherein the combined distortion is based on one or more geometric distortion and chromatic aberration properties of the at least one display lens.

6. The method of claim 1, further comprising:

performing a camera calibration operation to determine intrinsic and extrinsic parameters of the at least one see-through camera lens, the first distortion based on the intrinsic and extrinsic parameters of the at least one see-through camera lens; and performing a display lens calibration operation to determine intrinsic and extrinsic parameters of the at least one display lens, the second distortion based on the intrinsic and extrinsic parameters of the at least one display lens.

7. The method of claim 6, wherein:

performing the camera calibration operation comprises generating at least one camera matrix and at least one distortion model; and performing the display lens calibration operation comprises generating reversed display lens distortions.

8. A video see-through (VST) augmented reality (AR) device comprising:

at least one display comprising at least one display lens;

at least one see-through camera comprising at least one see-through camera lens and configured to capture an image; and at least one processing device configured to:

obtain the image captured by the at least one see-through camera;

identify a first distortion created by the at least one see-through camera lens;

identify a second distortion created by the at least one display lens;

determine a combined distortion based on the first distortion and the second distortion;

pre-warp the image to offset the combined distortion; and present the pre-warped image to a user on the at least one display;

wherein, to pre-warp the image, the at least one processing device is configured to:

retrieve a specified distortion mesh configured to compensate for the combined distortion, wherein the specified distortion mesh is associated with a first color channel;

apply the specified distortion mesh to pre-warp the first color channel of the image;

access a first specified distortion difference between the first color channel and a second color channel; and apply the specified distortion mesh and the first specified distortion difference to pre-warp the second color channel of the image.

9. The VST AR device of claim 8, wherein, to pre-warp the image, the at least one processing device is further configured to:

access a second specified distortion difference between the first color channel and a third color channel; and apply the specified distortion mesh and the second specified distortion difference to pre-warp the third color channel of the image.

10. The VST AR device of claim 8, wherein the at least one processing device is configured to pass the first specified distortion difference to a shader instead of a distortion mesh for the second color channel.

11. The VST AR device of claim 8, wherein the combined distortion is based on one or more intrinsic properties of the at least one see-through camera lens.

12. The VST AR device of claim 8, wherein the combined distortion is based on one or more geometric distortion and chromatic aberration properties of the at least one display lens.

13. The VST AR device of claim 8, wherein the at least one processing device is further configured to:

perform a camera calibration operation to determine intrinsic and extrinsic parameters of the at least one see-through camera lens, the first distortion based on the intrinsic and extrinsic parameters of the at least one see-through camera lens; and perform a display lens calibration operation to determine intrinsic and extrinsic parameters of the at least one display lens, the second distortion based on the intrinsic and extrinsic parameters of the at least one display lens.

14. The VST AR device of claim 13, wherein:

to perform the camera calibration operation, the at least one processing device is configured to generate at least one camera matrix and at least one distortion model; and to perform the display lens calibration operation, the at least one processing device is configured to generate reversed display lens distortions.

15. A non-transitory machine readable medium containing instructions that when executed cause at least one processor to:

obtain an image captured by a see-through camera of a video see-through (VST) augmented reality (AR) device;

identify a first distortion created by at least one see-through camera lens;

identify a second distortion created by at least one display lens of the VST AR device;

determine a combined distortion based on the first distortion and the second distortion;

pre-warp the image to offset the combined distortion; and present the pre-warped image to a user on at least one display of the VST AR device;

wherein the instructions that when executed cause the at least one processor to pre-warp the image comprise instructions that when executed cause at least one processor to:

retrieve a specified distortion mesh configured to compensate for the combined distortion, wherein the specified distortion mesh is associated with a first color channel;

apply the specified distortion mesh to pre-warp the first color channel of the image;

access a first specified distortion difference between the first color channel and a second color channel; and apply the specified distortion mesh and the first specified distortion difference to pre-warp the second color channel of the image.

16. The non-transitory machine readable medium of claim 15, wherein the instructions that when executed cause at least one processor to pre-warp the image further comprise instructions that when executed cause at least one processor to:

access a second specified distortion difference between the first color channel and a third color channel; and apply the specified distortion mesh and the second specified distortion difference to pre-warp the third color channel of the image.

17. The non-transitory machine readable medium of claim 15, wherein the combined distortion is based on one or more intrinsic properties of the at least one see-through camera lens.

18. The non-transitory machine readable medium of claim 15, wherein the combined distortion is based on one or more geometric distortion and chromatic aberration properties of the at least one display lens.

19. The non-transitory machine readable medium of claim 15, wherein the instructions when executed cause the at least one processor to pass the first specified distortion difference to a shader instead of a distortion mesh for the second color channel.

20. The non-transitory machine readable medium of claim 15, further containing instructions that when executed cause the at least one processor to:

perform a camera calibration operation to determine intrinsic and extrinsic parameters of the at least one see-through camera lens, the first distortion based on the intrinsic and extrinsic parameters of the at least one see-through camera lens; and perform a display lens calibration operation to determine intrinsic and extrinsic parameters of the at least one display lens, the second distortion based on the intrinsic and extrinsic parameters of the at least one display lens.

\* \* \* \* \*